Aug. 16, 1966  R. H. BERG  3,266,526
PERIPHERALLY LOCKED AND SEALED ORIFICE DISK AND METHOD
Filed Nov. 26, 1962

INVENTOR.
ROBERT H. BERG
BY
ATTORNEYS

United States Patent Office 3,266,526
Patented August 16, 1966

3,266,526
PERIPHERALLY LOCKED AND SEALED ORIFICE
DISK AND METHOD
Robert H. Berg, 196 Clinton Ave., Elmhurst, Ill.
Filed Nov. 26, 1962, Ser. No. 240,093
4 Claims. (Cl. 138—103)

This invention relates to improvements in glass-mounted orifice structures and a method of making the same, and more particularly to orifices of the type useful in various scientific apparatus for controlling flow, measurement, and the like, requiring high resistance against chemical and physical deterioration.

Glass receptacles with one or more orifices through the walls thereof have long been known, as for example, in the liquid interrupter, of which an early disclosure is found in the May 10, 1899, issue of Electrical Review, page 295. Since that time, such glass receptacles with orifices in the sides thereof have been used in such apparatus as particle counters. In order to attain greater uniformity of size in the orifice openings, hard glass or more durable wafers having the orifices therethrough have been cemented or fused in alignment with holes in the sides of the glass receptacles. For example, in U.S. Patent 2,985,830 is disclosed an arrangement wherein sapphire disks are fused onto flat surfaces on the receptacles.

A disadvantage of the cemented orifice wafers is that they tend to become dislodged by reason of failure of the cement or its deterioration in the presence of deleterious chemicals, disruption by expansion and contraction, or even due to handling.

In the fused-on type or orifice wafers, a carefully ground flat surface must be provided on the receptacle in order to have close face-to-face abutment of the wafer with the glass surface to effect adequate fusing. Also, wafer fragility results from the proportionately large wafer diameters which are required in order to provide adequate bonding surface.

An important object of the present invention is to provide an unusually rugged, permanent attachment of an orifice disk in a glass wall, eliminating entirely any need for difficult and often elaborate face-to-face cementing or fusing methods.

Another object of the invention is to provide a new and improved attachment of a ceramic orifice disk in a glass wall, such as that of a glass receptacle, or other type of glass member, by peripherally locking and sealing the disk in the sidewall of an aperture through the glass wall.

Still another object of the invention is to provide a new and improved mounting for and method of mounting an orifice disk in a convexly shaped and relatively thin wall of glass such as that of a tubular vessel.

A yet further object of the invention is to provide a new and improved orificed glass vessel.

Other objects, features and advantages of the present invention will be readily apparent from the following detailed description of an exemplary embodiment taken in conjunction with the accompanying drawing, in which.

Figure 2:
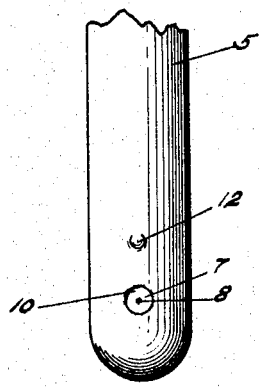
FIGURE 2 is another view of the vessel, looking toward the side thereof which faces toward the right in FIGURE 1.
Figure 1:
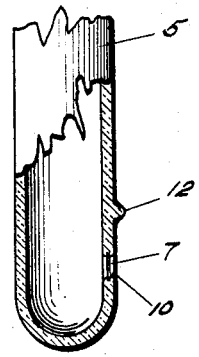
FIGURE 1 is a fragmentary, partially sectional view of a glass vessel embodying features of the invention.

A glass wall 5, which may be part of any appropriate member or device, has mounted therein an orifice disk 7 having therethrough an orifice 8 affording a passage through the wall 5. By way of example, the wall 5 is part of a receptacle (FIGS. 1 and 2) of generally test tube form.

For durability and resistance to physical and chemical deterioration, as well as to enable desirable accuracy in the dimensions of the orifice 8 for whatever purpose intended, the orifice disk 7 is made of a suitable substance such as a ceramic material, including quartz, porcelain, spinel, sapphire, etc., either natural or synthetic, or any other mineral of similar desirability as to hardness, chemical resistance, machineability, etc.

For purposes of economy and strength, the disk 7 is desirably of as small a wafer size and ratio of diameter to thickness as may practically be usable for the intended purposes. Thus, for orifice sizes ranging from ten to 1000 microns a disk diameter of about 1.5 mm. to 3.0 mm. and a rim thickness of about 0.3 to 0.6 mm. may be used. Any preferred reduction in orifice length is attained by reducing the thickness of the disk wafer about the orifice 8, desirably by means of a concave recess 9, at one or both faces of the disk, immediately about the orifice and substantially spaced from the perimeter of the disk. Such shapes formed of sapphire are commonly made in the manufacture of watch jewels and for that reason, among others, substantial economies can be effected by the present invention, since there are relatively inexpensive commercially available sources of the basic disk shapes.

Figure 3:
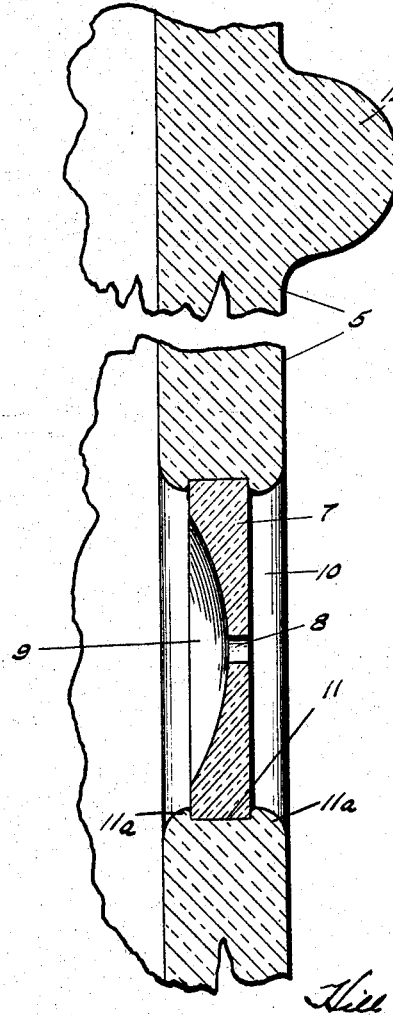
FIGURE 3 is a substantially enlarged sectional detail view of that portion of the glass wall of the vessel having the orifice disk.
Figure 4:
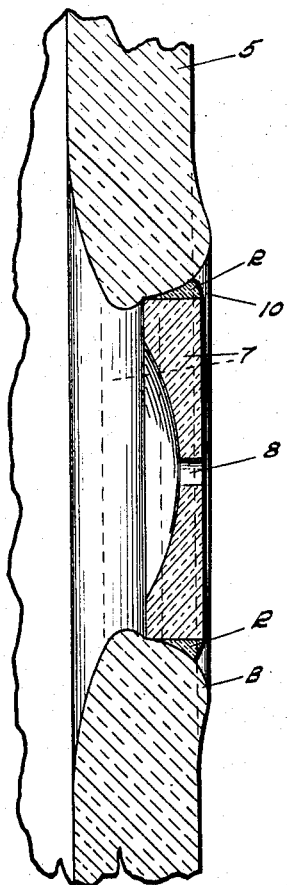
FIGURE 4 is a more or less schematic sectional view similar to FIGURE 3 but illustrating certain steps in the method of uniting the orifice disk with the glass wall.

As best seen in FIGURES 3 and 4, the disk 7 is mounted within an aperture 10 in the wall 5. Excellent results have been obtained by a peripherally locked and sealed securement of the disk 7 in the aperture 10 wherein the perimeter of the disk is completely and intimately adhered to the sidewall defining the aperture 10. This sealing and locking is by direct adherence of the glass sidewall defining the aperture 10 in a contracted relationship of the aperture sidewall about the disk perimeter, preferably to the extent that the perimeter of the disk is at least slightly embedded in intimately conforming and adhering and firm, interlocked relation within a groove 11 in the aperture sidewall and spaced from both faces of the glass wall, providing retaining projections 11a opposing each margin of the disk.

In a simple, expeditious method of assembling the disk 7 within the aperture 10, referring to FIGURE 4, the aperture 10 is formed in the glass wall to a dimension which is preferably slightly undersize, that is of smaller diameter, than the diameter of the disk 7, in any preferred manner, as by known glass blowing technique. After or coincident with formation of the disk-receiving aperture 10, the margin of the glass wall 5 about the aperture is bulged as at B substantially uniformly toward one side of the wall, conveniently toward the outer side of the receptacle, so that the sidewall defining the aperture 10 provides a generally flaring mouth substantially larger in diameter than the disk at the apex of the bulge and smaller in diameter than the disk at an inner portion of the bulge. The disk 7 is then set in place within the flaring aperture 10 and the bulge B in softened, i.e., workably plastic, condition is moved back and contracted into substantially the plane of the wall 5. During such return of the bulge B, the disk 7 is moved concurrently as by being carried with the engaging contracting aperture sidewall surface into the locked position of the disk in the wall 5, as shown on comparison of the full line and the dotted line positions in FIGURE 4. Since the material of the glass wall about the perimeter of the disk 7 is in a softened and adherent condition, the disk perimeter becomes uniformly and firmly lockingly embedded in the aperture sidewall.

In order to avoid the need for over-softening the receptacle wall about the aperture 10 during the disk-assembly steps, and yet attain thoroughly adherent bonding of the disk perimeter with the glass of the receptacle, the disk perimeter is preferably wetted beforehand with a bead or rim R of the glass, according to known glass blowing technique, before the disk is laid into the flared aperture 10. Hence, at the temperature wherein the glass is sufficiently soft to be properly workable, yet not so soft as to tend to run or distort, the glass of the rim R will weld or fuse adequately with the glass defining the aperture 10 to afford the sealed relationship between the disk perimeter and the orifice sidewall.

The preferred material of the orifice disk 7 is of favorable dimensional proportions and of higher unit strength than the glass of the wall 5, so that the disk resists compression and other stresses on hardening of the larger mass of gripping glass on its perimeter. Proper annealing of the glass reduces such stresses in the disk 7 and in the surrounding glass. In order further to minimize stress damage liability, the disk 7 is preferably pre-polished on all surfaces, or at least should be free from surface cracks or abrasions of any consequential depth.

Excellent results have been attained where the wall 5 is made from a borosilicate glass of high chemical durability resistant to alkalies, acids and water erosion, and selected for ease of working, high thermal and mechanical shock resistance, and suitable compatibility with any glass parts to which it may be desired to weld it in an assembly.

In addition to other advantages, the present method of mounting the orifice disk 7 in the aperture 10 in the wall 5 requires no special form or flatness or ground surface on the wall to enable attachment of the disk but permits the disk to be mounted in the preferred wall shape which may, as shown, by cylindrical, or any other desirable contour.

By virtue of its inset or recessed disposition relative to the wall face plane, the orifice disk 7 is substantially shielded not only against deleterious contacts with foreign objects but also against blockage or throttling of flow through the orifice 8 by any such object. However, in order further to assure that the orifice will be kept clear of blockage or undesirable throttling against free flow as by engagement of the outer face of the wall 5 against the wall of an encompassing receptacle or other contiguous object, a spacer node 12 is preferably provided adjacent to the aperture 10 to project from the outer surface of the wall 5. If desired, of course, such a spacer node may be provided alternatively, or in addition, at the inner surface of the wall 5 adjacent to the aperture 10. In a practical construction, such node 12 may be about one millimeter in height and spaced as for example about one centimeter from the aperture.

It will be understood that modifications and variations may be effected without departing from the scope of the novel concepts of the present invention.

I claim as my invention:

1. In a method of mounting an orifice disk in a glass wall having opposite faces,
    forming an aperture through said wall to open through the respective opposite faces,
    softening the material about the aperture and bulging the material of the glass wall about the aperture to project from one of said faces and to effect a flaring sidewall at that end of the aperture,
    assembling the disk with its perimeter in the flaring sidewall,
    and while the bulged material is in a softened condition moving it back toward the plane of said one face and reducing the flare of the sidewall and thereby moving it into locking engagement with the perimeter of the disk.

2. A method as defined in claim 1, including the steps of wetting the perimeter of the disk with glass compatible with the glass of the glass wall, and fusing the wetting glass to said sidewall to provide adherent bonding of the disk perimeter to the glass of said wall.

3. A glass receptacle wall having an aperture therethrough with opposite ends at respectively opposite sides of said wall,
    a ceramic disk of a diameter within the range of about 1.5 mm. to 3.0 mm.,
    said aperture being defined by a sidewall of substantially the same diameter as the disk about the perimeter of the disk,
    said disk having a rim of a thickness of about 0.3 mm. to 0.6 mm.,
    said disk having an orifice therethrough of a diameter within a range of about 10 to 1000 microns,
    said disk being located within said aperture between the opposite ends thereof and having its perimeter ceramically adherently bonded to said sidewall,
    and glass projections on said sidewall at both opposite ends of said aperture lockingly overlappingly opposing the respective opposite surfaces of the margin of said rim.

4. A receptacle as defined in claim 3 in which said wall is substantially uniformly circularly cylindrically shaped with inner and outer wall surfaces, and a spacer node projecting integrally from one of said wall surfaces adjacent to said aperture to maintain said one wall surface spaced from a contiguous object.

References Cited by the Examiner

UNITED STATES PATENTS

| | | | |
|---|---|---|---|
| 2,369,338 | 2/1945 | Carlson et al. | 58—140 |
| 2,671,309 | 3/1954 | Marti et al. | 58—140 |
| 2,862,336 | 12/1958 | Edwards et al. | 65—55 |
| 2,985,830 | 5/1961 | Coulter et al. | 65—38 |
| 3,002,645 | 10/1961 | Kegg | 65—43 |
| 3,029,695 | 4/1962 | Wolf. | |

ALEXANDER WYMAN, *Primary Examiner.*

EARL M. BERGERT, W. J. VAN BALEN,
*Assistant Examiners.*